United States Patent [19]
Haynes

[11] Patent Number: 5,785,466
[45] Date of Patent: Jul. 28, 1998

[54] TOOL FOR ALIGNING A PORTABLE BORING BAR FOR REBORING OF A BORE AT A LOCATION RELATIVE TO A FURTHER BORE

[76] Inventor: George C. Haynes, 8724 Rutledge Pike, Knoxville, Tenn. 37924

[21] Appl. No.: 721,284

[22] Filed: Sep. 26, 1996

[51] Int. Cl.$^6$ ............................................. B23B 41/00
[52] U.S. Cl. ........................... 408/80; 408/81; 408/97; 408/103; 408/115 R
[58] Field of Search ........................ 408/80, 79, 81, 408/54, 97, 115 R, 103, 708

[56] References Cited

U.S. PATENT DOCUMENTS

| | | | |
|---|---|---|---|
| 2,351,243 | 6/1944 | Vetter | 408/97 |
| 2,608,113 | 8/1952 | Stainton | 408/115 R |
| 2,834,233 | 5/1958 | Anderson | 77/2 |
| 3,148,562 | 9/1964 | Moss | 77/62 |
| 3,212,366 | 10/1965 | Russell et al. | 77/62 |
| 3,674,375 | 7/1972 | Reed et al. | 47/28 |
| 3,767,316 | 10/1973 | Dumont, Jr. | 408/79 |
| 3,775,857 | 12/1973 | Handy | 408/115 R |
| 3,973,860 | 8/1976 | Kern | 408/115 R |
| 4,040,763 | 8/1977 | Assenmacher | 408/1 R |
| 4,137,003 | 1/1979 | Budoff | 408/103 |
| 4,346,508 | 8/1982 | Baumann et al. | 29/402.18 |
| 4,451,186 | 5/1984 | Payne | 408/54 |
| 4,753,557 | 6/1988 | Besnier | 408/115 R |
| 4,759,666 | 7/1988 | Grab | 408/115 B |
| 4,990,037 | 2/1991 | Strait | 408/72 R |
| 5,209,615 | 5/1993 | Davis | 408/54 |
| 5,308,199 | 5/1994 | Juang | 408/115 R |

*Primary Examiner*—Daniel W. Howell
*Assistant Examiner*—Adesh Bhargava
*Attorney, Agent, or Firm*—Paul E. Hodges, PC

[57] ABSTRACT

A tool for aligning a portable boring bar for reboring of a bore at a location relative to a further bore including at least first and second "H"-shaped rigid guide members that are hingedly connected to permit their outboard ends to be selectively spaced apart. Each guide member includes first and second side members adapted to be disposed on opposite surfaces of an equipment component which is to be rebored, each side member for the first guide member having an outboard end designed to be aligned with a first bore, and each of the side members of the second guide member being designed to be aligned with a further bore spaced apart from the first bore. The tool serves as an alignment tool and/or as a mount for the drive unit of a portable boring bar.

7 Claims, 7 Drawing Sheets

TOOL FOR ALIGNING A PORTABLE BORING BAR FOR REBORING OF A BORE AT A LOCATION RELATIVE TO A FURTHER BORE

FIELD OF INVENTION

This invention relates to reboring of bores associated with moving parts of massive earthmoving equipment, and particularly to the reboring of such bores without the requirement of huge metalworking machines.

BACKGROUND OF INVENTION

Massive earthmoving equipment commonly includes various articulating components. These articulating components frequently are mounted to one another in a manner which causes one component to move (e.g., rotate) when its cooperating component is moved in an arc, for example. One example is the bucket mounted on the end of the boom of a track loader. Another example of these articulating components is the mounting between the tractor and the pan of an earth mover. In each event, the equipment involved is very large and can not be readily moved to a repair shop. Even removal of a component of the equipment frequently requires a crane due to the great weight of the component.

The points of articulation between these components of earthmoving equipment comprise bores through the thickness of a component. These bores wear with time, both from the standpoint of enlargement of the bore and/or nonconcentric wear, especially near the outer ends of the bore.

In many applications, the points of articulation include multiple bores. At times, these multiple bores are in sets, with the bores of a first set being in register. Further, often the bores of a first set must be spaced apart from the bores of a second set, and further the centerline axes of the bores in both sets need to be parallel. Examples include the bores employed in mounting a bucket onto the boom of a backhoe or the bores in the gooseneck mounting of a tractor and pan earth mover. The components of earthworking equipment vary in size and shape between types of such equipment, leading, among other things, to bores of different lengths. For different pieces of equipment, the distance between the bores are different, adding to the complexity of reboring operations.

In many instances it is required that the bores of a set be in register with one another and that their common centerline axis be perpendicular to the plane of the component being rebored. Failure to attain this alignment can result in binding or seizing of the components within their articulating joints. This alignment ensures that movement of a first component of an item of earthworking equipment within a given plane effects movement of a second component, that is articulatingly mounted on the first component, within the same plane. No known prior alignment tool is capable of insuring this alignment since the known prior alignment tools function on only one side of a component being rebored so that there is little, if any, assurance that the common centerline axes of the rebored bores will be perpendicular to the plane of the component being rebored.

Portable boring bars have been proposed for use in reboring worn bores on large earthmoving equipment. Whereas these bars are capable of performing a reboring operation, they do not have provision associated therewith for locating the desired centerline axes of a first set of bores with respect to the centerline axes of a second set of bores. Accordingly, mounting of a portable boring bar onto a component of earthmoving equipment for a reboring operation can be difficult and time consuming. These problems are of particular concern when attempting boring operations in the field, i.e. at the work side of the earthmoving equipment.

It is therefore an object of the present invention to provide a tool for aligning a portable boring bar at a precise location relative to first and second bores.

It is another object to provide a tool for aligning a portable boring bar in position for a reboring operation on a component of massive earthworking equipment.

SUMMARY OF INVENTION

The present invention addresses the problem of positioning a portable boring bar on a component of earthworking equipment at a location for reboring one or more bores, which have been rebuilt as by welding, the bores being spaced apart from one another at locations that are required for the proper functioning of the earthworking equipment.

In accordance with one aspect of the present tool, there are provided first and second "H"-shaped guide members. Each of these guide members is made up of first and second rigid elongated side members that are equal in length and secured in spaced apart and parallel relationship to one another as by rigid cross members that extend between, and are fixedly secured to, the spaced apart side members. The side members and their connecting cross members occupy a common plane. Each side member of the first guide member includes a first outboard end which is provided with a bore through the thickness thereof. The centerline axis of this bore is perpendicular to the length dimension of the side member and perpendicular to the plane of the guide member. The opposite, inboard, end of each side member of the first guide member defines a clevis-type receiver.

The second "H"- shaped guide member is also made up of first and second preferably equal length, rigid elongated side members and rigid cross members that occupy a common plane. This second "H"-shaped guide member is substantially like the first "H"-shaped guide member except the second, and inboard, end of each of its side members is adapted to be received in articulating relationship in the clevis-type receivers of the second ends of the side members of the first "H"-shaped guide member. When so related, a clevis pin is inserted in the mating inboard ends of the guide members so that the first and second guide members are hingedly connected to one another. By this means, the first and second guide members may be adjusted, relative to one another, so that their respective planes assume any of several angles which have their origin at the location of the longitudinal axis of the clevis pins. By this means, the distance between the respective first, outboard, ends of the two guide members may be selected.

The side members of the first and second guide members are spaced apart laterally of one another by a distance sufficient to permit the outboard ends of the side members to be disposed on opposite sides of a component which is to be rebored. By reason of the parallelity and rigidity of the construction of the present alignment tool, the present tool permits accurate alignment of the axes of the bores of multiple sets substantially perpendicular to the plane of the component being rebored. In addition to attainment of this perpendicularity, the respective centerline axes of all the bores of the sets are parallel to one another, thereby ensuring smooth and proper articulation between the rebored component and its mounting component.

In one embodiment, at least one of the side members of each of the two guide members is provided with means for attachment thereto of a spot weld plate for use in anchoring the two guide members to the equipment component in position for guiding a boring bar in a reboring operation.

Further, in one embodiment, there is provided an angle adjustment means extending between the two guide members for mechanically selecting and setting the angular relationship between the two guide members.

In use, the outboard second ends of the first and second side members of each guide member are positioned on opposite sides of component which is to be rebored. Employing cone members and a cylindrical bar as known in the art, the bores through the outboard second ends of one of the guide members are aligned with a first bore through the thickness of the component which is to be rebored. Notably, at this stage of the operation, the operator is only required to handle the present tool. Further, at this stage of the operation, the first guide member is rotatable with respect to the first bore, the second guide member is free to articulate about the axis of its joinder with the first guide member.

The first guide member is temporarily secured in its position of alignment with the first bore, by the cones and bar arrangement. Thereupon, the first guide member and the second guide member are rotated about the axis their joinder to select a linear distance between the bores in their respective outboard ends. This linear distance equator to the desired linear distance between first and second bores through the component to be rebared, so that the selected angular relatively between the first and second guide member. This action positions the bores of the outboard ends of the second guide member in alignment with the desired location of a second bore through the thickness of the component being worked upon.

When the respective outboard second ends of the first and second guide members are aligned with the first and second bore locations through the component, the second guide members are anchored to the component as by spot welding the guide members to the component. Rather than actually spot welding the guide member itself to the component, the present invention preferably provides a spot welding plate that is anchored to the guide member and which extends from the guide member to the component where this plate is spot welded to the component.

With the present alignment tool thus attached to the component being worked upon, a portable boring bar may be attached to the alignment tool at the location of either of the first and second bores for carrying out the reboring of either bore. In accordance with one aspect of the present invention, there is provided on each of the outboard ends of each of the side members of each of the first and second guide members, a mount designed to receive a portable boring bar. This mount preferably is made universal in nature to receive any of several commercially available portable boring bars.

DETAILED DESCRIPTION OF INVENTION

Figure 1:
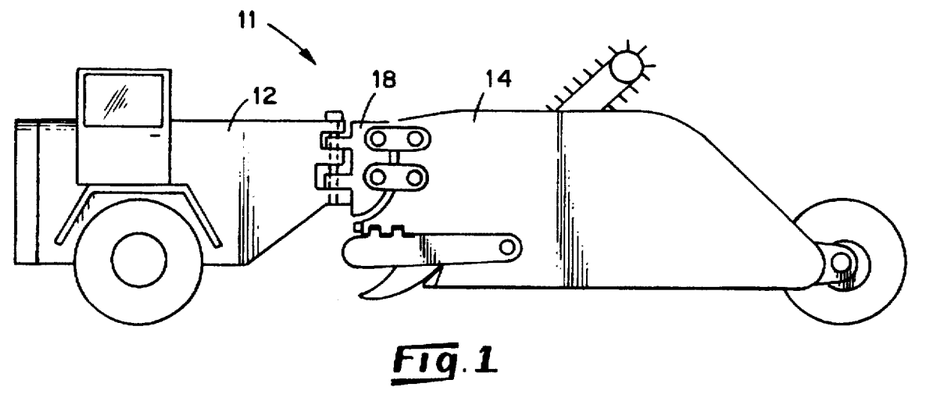
FIG. 1 is a representation of a tractor and pan type earth moving machine.
Figure 2:
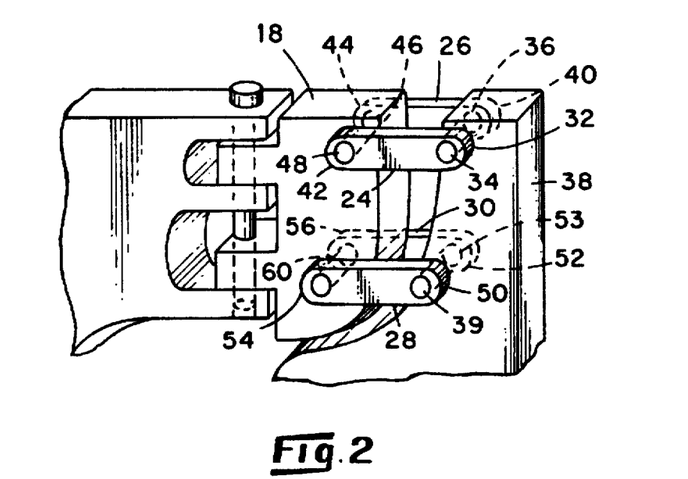
FIG. 2 is a representation, in perspective, of an articulating connection between the tractor and pan of the machine depicted in FIG. 1.
Figure 3:
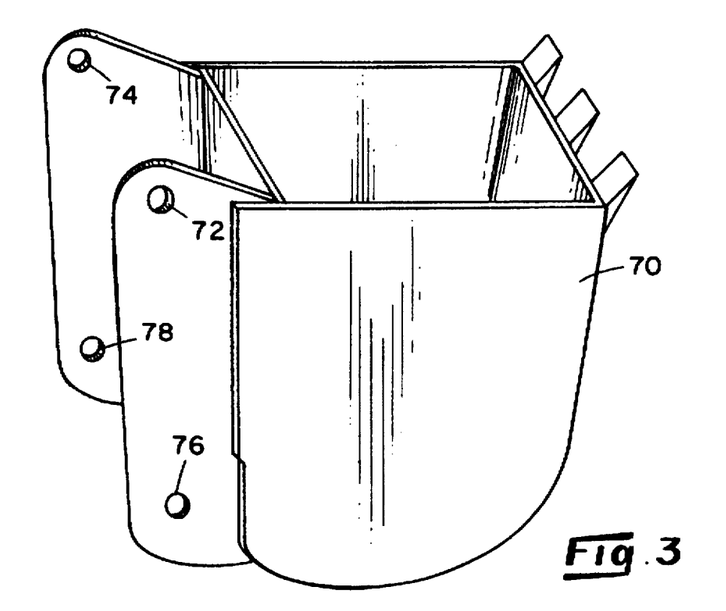
FIG. 3 is a representation, in perspective, of a backhoe bucket.

In FIGS. 1–3 there are depicted two examples of heavy-duty earth moving equipment which include multiple spaced apart bores or sets of bores which are amenable to reboring employing the present invention. FIG. 1 depicts a common tractor 12 and pan 14 earth mover 11. FIGS. 1 and 2 depict the articulated connection between the tractor and the pan, such connection including a connector block 18 which is mounted to the pan as by means of first and second sets of parallelogram-type bars 24, 26, 28 and 30. One end, 32 for example, of a first one 24 of the bars is mounted to the pan as by means of a pin 34 that extends through the thickness of the bar 24, thence through a first bore 36 that extends through the thickness of the pan component 38, and extends beyond the opposite side of the pan component to also serve to pivotally mount one end 40 of a further one 26 of the bars of the first set, to the pan component 38. The opposite ends 42 and 44 of the first set of bars 24 and 26 are pivotally mounted in a bore 46 through the thickness of the connector block 18 as by a pin 48. The bars 28 and 30 of the second set of bars 28 and 30 are mounted at one of their respective ends 50 and 52 on the pan component in like manner as the bars 24 and 26 of the first set, but at a location spaced apart from the first bore 36, as by means of a pin 39 that extends through the thickness of the bars and a bore 53 through the thickness of the pan component 38. In like manner, the opposite ends 54 and 56 of the bars 28 and 30 are pivotally mounted to the connector block 18 as by a pin 58 that extends through the thickness of the bars 28 and 30 and through respective bores 50 and 52 through a bore 50 the thickness of the connector block 18. To ensure proper articulation of the pan with the connector block, the longitudinal axes of the bores 36 and 52 are to be essentially parallel to one another. Further, the longitudinal axes of the bore 46 and 60 are to be essentially parallel to one another.

Still further, the spacing between the bores 36 and 53 and the spacing between the bore 46 and 60 is important in maintaining the parallelogram-type mounting of the connector block to the pan component 38.

A further example of an item of heavy earth moving equipment which is amenable to repair of its mounting bores by means of the present invention is depicted in FIG. 3 and includes a bucket 70 for a backhoe (not shown). This bucket is mounted on the outboard end of a boom of the backhoe by means of a first set of bores 72 and 74 and a second set of bores 76 and 78. The bores 72 and 74 need be axially aligned with one another and the bores 76 and 78 need be axially aligned with one another. Further, the spacing between the bores 72 and 76 is important to the proper articulation of the bucket on the end of its mounting boom, as is the spacing of the bores 74 and 78 with respect to one another. Further, proper operation of the bucket requires that the common axis of the bores 72 and 74 be essentially parallel to the common axis of the bores 76 and 78.

Figure 4:
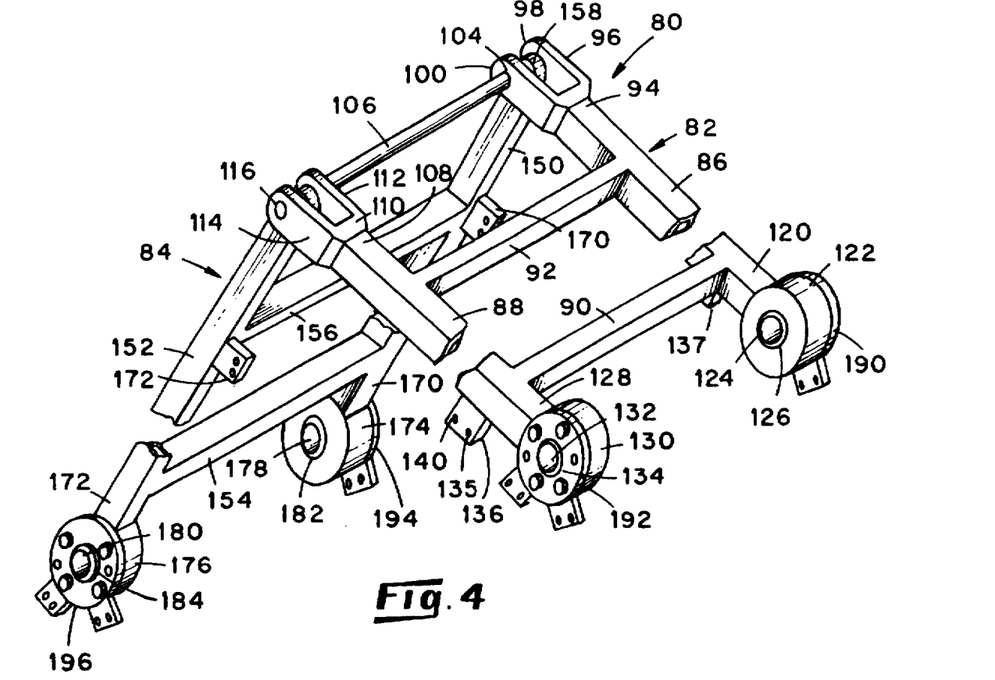
FIG. 4 is a representation, in perspective, of an alignment tool embodying various of the features of the present invention.
Figure 5:
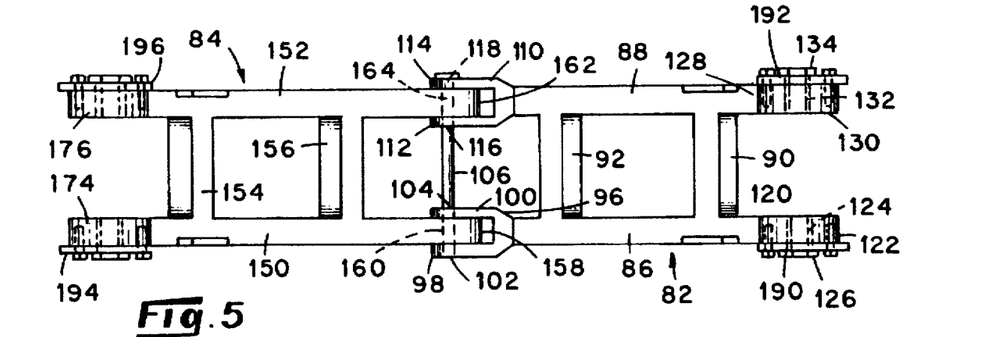
FIG. 5 is a bottom view of the alignment tool of FIG. 4.
Figure 6:
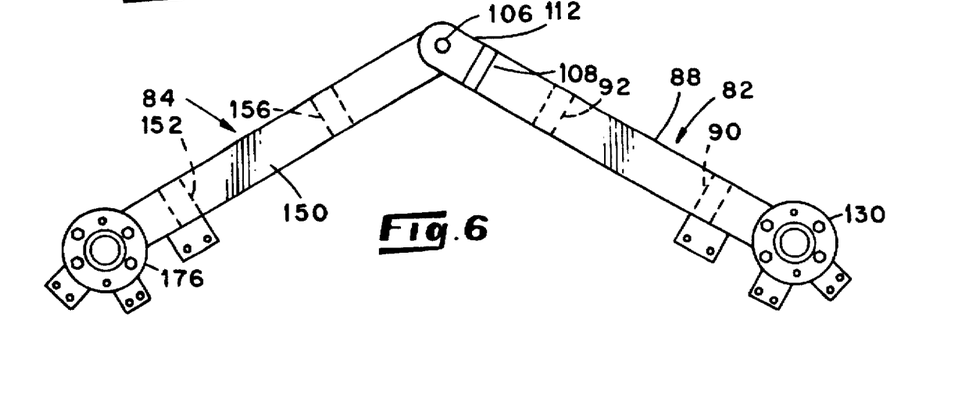
FIG. 6 is a side elevational view of the alignment tool depicted in FIG. 4.

The present invention is particularly suitable for field reboring of the bores of many different pieces of heavy equipment, such as earth working equipment. In FIGS. 4-6 there is depicted a preferred embodiment of the tool of the present invention. As depicted, the tool 80 includes first and second "H"-shaped guide members 82 and 84. The first guide member 82 is made up of opposite side members 86 and 88, each of which is formed of a rigid material such as rectangular metal tubing (see also FIG. 8). These side members 86 and 88 are disposed in spaced apart parallel relationship to one another and secured in this orientation by means of rigid cross members 90 and 92. The side members and the interconnecting cross members occupy a common plane and by reason of their materials of construction and their rigid and fixed interconnection, remain in this common plane during use. That is, during use there is no twisting of the guide member, or other material deviation of a guide member from its plane.

The inboard end 94 of the first side member 86 is provided with a clevis-type connector 96 that includes opposite legs 98 and 100, each of which is provided with a bore 102 and 104, respectively, through the thickness thereof, such bores being axially aligned with one another for the receipt therethrough of a clevis pin 106. In like manner, the inboard end 108 of the second side member 88 is provided with a clevis-type connector 110 that includes opposite legs 112 and 114, each of which is provided with a bore 116 and 118, respectively, through the thickness thereof, such bores being axially aligned with one another, and in axial alignment with the bores 102 and 104, for the receipt therethrough of the clevis pin 106.

The outboard end 120 of the first side member 86 is provided with a mounting hub 122 secured thereto. The depicted mounting hub includes a central bore 124 through the thickness thereof which houses a bearing 126. The outboard end 128 of the opposite side member 88 is provided with a like mounting hub 130 which also has a bore 132 through the thickness thereof that houses a bearing 134. Further, the side member 88 is optionally provided with one or more anchor tabs 136 and 137 that are welded to the side members 88 and 86, respectively, and project therefrom to receive a mounting bracket as will appear hereinafter. Bores 135 and 140, typical, are provided in each of the anchor tabs and serve to receive bolts therein for releasably securing a disposable mounting bracket to the tab.

The tool of the present invention further includes a second guide member 84. Similarly to the construction of the first guide member 82, the second guide member 84 is made up of opposite side members 150 and 152, each of which is formed of a rigid material such as rectangular metal tubing. These side members 150 and 152 are disposed in spaced apart parallel relationship to one another and secured in this orientation by means of rigid cross members 154 and 156. The side members and the interconnecting cross members occupy a common plane and by reason of their materials of construction and their rigid and fixed interconnection, remain in this common plane during use. That is, during use there is no twisting of the guide member, or other material deviation of the guide member from its plane.

The inboard end 158 of the first side member 150 is provided with a bore 160 through the thickness thereof. In like manner, the inboard end 162 of the second side member 152 is provided with a bore 164 through the thickness thereof. The bores 160 and 164 are axially aligned with one another. As depicted the first and second guide members 80 and 84 are hingedly connected at their inboard ends. This is accomplished by inserting the inboard ends 158 and 162 of the side members 150 and 152 in respective ones of the clevis-type connectors 96 and 110 with the bores 160 and 162 of the inboard ends of the second guide member 84 in axial alignment with the bores through the respective legs of the clevis-type connectors 96 and 110 and inserting the clevis pin 106 through all these aligned bores. This interconnection of the first and second guide members provides for rotation of the guide members about the longitudinal axis of the pin 106 and, importantly, ensures that the guide members retain their respective planar attitudes at all angles of rotation thereof. More specifically, the hinge connection of the inboard ends of the first and second guide members is along an axis of rotation which is substantially parallel to an intersection of the respective planes of the first and second guide members such that through selection of the angular relationship of the planes of said first and second guide members, said outboard ends of said first guide member may be spaced apart from said outboard ends of said second guide member by a distance which is representative of the desired linear distance between the first bore and a further bore.

The outboard ends 170 and 172 of the side members 150 and 152 are each provided with a mounting hub 174 and 176, respectively, secured thereto. The mounting hubs 174 and 176 are each substantially identical to the mounting hubs 122 and 130 provided on the ends of the side members 86 and 88 of the first guide members. Each includes a central bore 178 and 180, respectively, through the thickness thereof, and each houses a bearing 182 and 184, respectively.

Anchor tabs 171 and 173 optionally are provided on the side members 150 and 152, respectively.

Figures 7, 8:
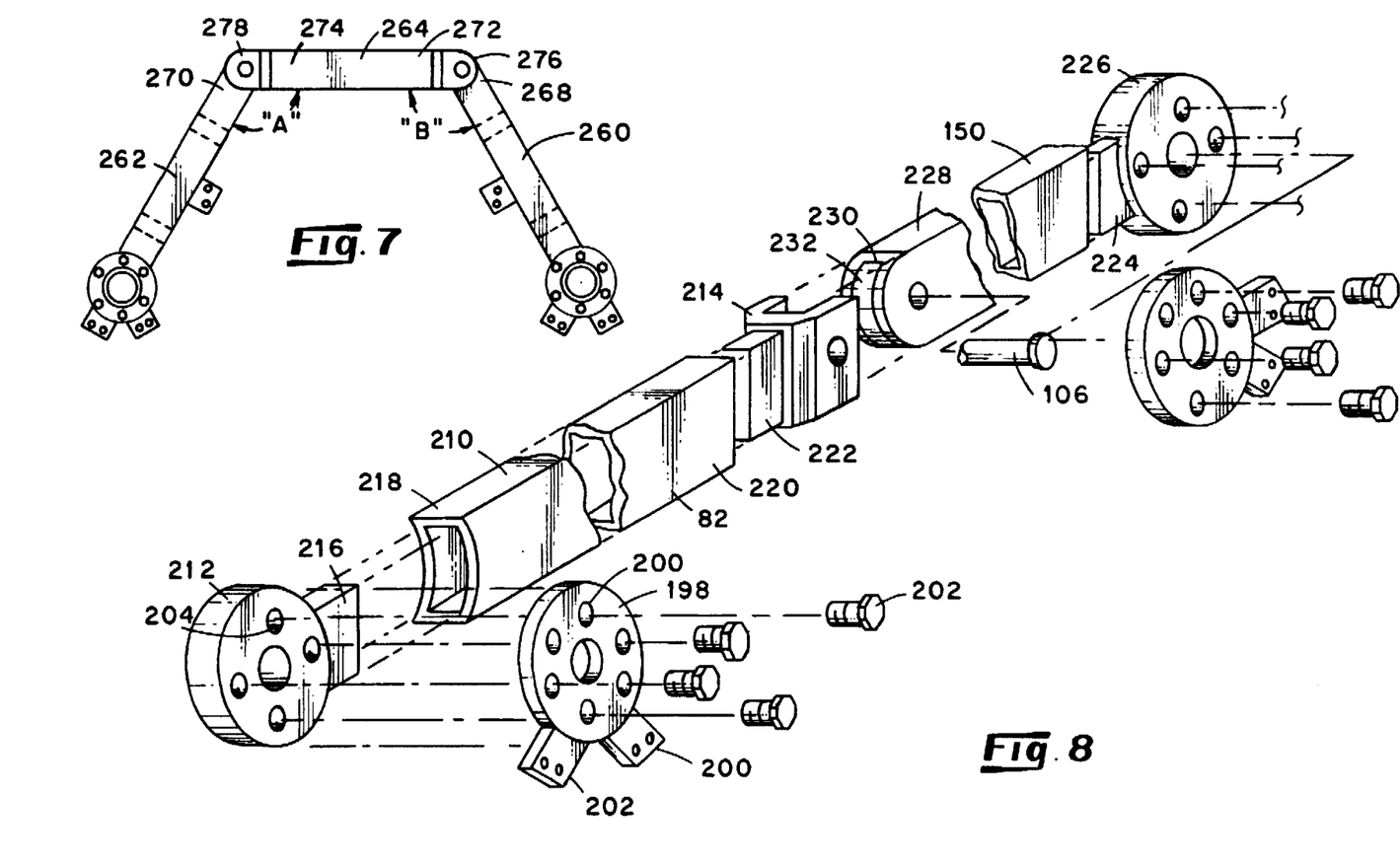
FIG. 7 is a side elevational view of an alternative embodiment of an alignment tool in accordance with the present invention.
FIG. 8 is an exploded view, in perspective, of one embodiment of a side member of a guide member of the alignment tool of the present invention.

In lieu of, or in addition to, the anchor tabs provided on the side members, in one embodiment of the present tool, the inventor provides mounting plates 190, 192, 194, and 196 releasably mounted to one or more of the mounting hubs 122, 130, 174 and 176, respectively. As best seen in FIG. 8, these mounting plates are substantially identical to one another, and each includes a planar body portion 198 having at least one and preferably two, anchor tabs 200 and 202 fixedly secured to the outer circumference thereof. Each mounting plate includes a plurality of circumferentially spaced apart bores 201 (typical) through the thickness thereof to receive therethrough bolts 203 (typical) that are received in internally threaded bores 204 (typical) circumferentially spaced apart in each mounting hub. Each hub preferably includes four bores spaced apart by 90 degrees, while each mounting plate includes six holes spaced apart by 60 degrees so that a mounting plate may be mounted to a hub in any of several rotational positions. This angular adjustability of the plate with respect to the mounting hub provides of selectivity of the position of the anchor tabs on the mounting plate. This selectivity is of importance to provide adjustability of the location of the anchor tabs with respect to the equipment component that is being rebored, so that one or more of the tabs can be assured of being disposed contiguous with some portion of the equipment component and thereby in position to permit the anchoring of a mounting hub to the equipment component once the tool has achieved the desired alignment position with respect to the bores of the equipment component which are to be rebored.

In FIG. 8 there is depicted an exploded view of a preferred construction of a side member, 82 for example, of a first guide member and of a side member 150, for example, of a second guide member, including their preferred pivotal interconnection. In FIG. 8 the side member 82 includes a metal tube 210, a mounting hub 212 and a clevis-type connector 214. As shown, the mounting hub 212 is provided with a stub projection 216 extending therefrom and adapted to be received with the hollow interior of one end 218 of the tube 210. The opposite end 220 of the tube 210 receives therein a stub projection 222 of the clevis-type connector 214. Once the hub and connector are fitted into the tube, these components are welded to the tube to ensure their rigidity and retention of their relative positions. The side member 150 of the second guide member likewise comprises a hollow metal tube which receives therein a projection 224 provided on its mounting hub 226. The inboard end 228 of the side member 150 is closed as by a plug 230 which is provided with a rounded end 232. This plugged end 228 of the side member 150 is received within the clevis-type connector 214 and these two components are hingedly connected as by the clevis pin 106. The rounding of the plugged end 228 of the side member 150 provides clearance for the hinged movement of the side members with respect to one another.

Figures 9, 10:
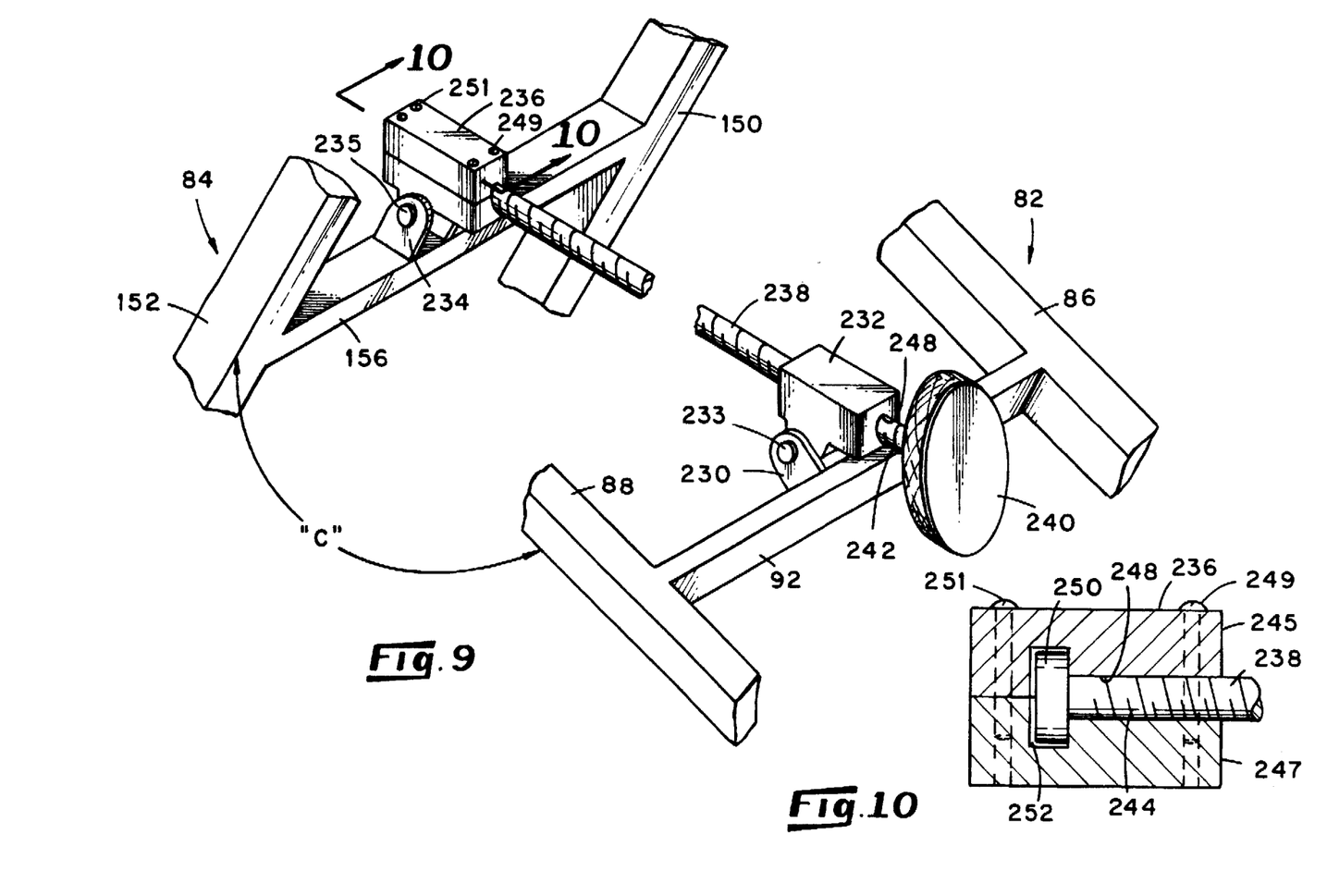
FIG. 9 is a schematic representation of a portion of each of two guide members as employed in the alignment tool of the present invention, and depicting one embodiment for selecting the angular relationship of the guide members with respect to one another.
FIG. 10 is a sectional view of a guide block employed in the angular selection embodiment depicted in FIG. 9.

With reference to FIGS. 9 and 10, in one embodiment of the present tool there is provided means for mechanically selecting the angular relationship between the first and second guide members 82 and 84. In the depicted embodiment, there is fixedly mounted on the cross member 92 of the first guide member 82 a bracket 230 which serves as a pivot mount for a guide block 232. On the cross member 156 of the second guide member 84 there is fixedly mounted a further bracket 234 which serves as a pivot mount for a second guide block 236. Pins 233 and 235 serve to pivotally connect the guide blocks 232 and 236 to their mounting brackets 230 and 234, respectively. An externally threaded rod 238 is fed through an internally threaded bore 240 through the first guide block 232 such that rotation of the rod 238 about its longitudinal axis functions to advance or retract the rod through the guide block 232, depending upon the direction of rotation of the rod. A knurled knob 240 secured to the end 242 of the rod 238 provides means for grasping the rod for rotation thereof.

Referring also to FIG. 10, the opposite end 244 of the rod 238 is housed internally of the guide block 236. As depicted, the guide block 236 is formed in two parts 245 and 247 which are combined as by bolts 249 and 251. Within the interior of the guide block 236 there is provided a cavity 248 which is "T"-shaped in section. A button 250 secured to the end of the rod 238 resides in the cross arm portion 252 of the cavity while the end 244 of the rod resides within the leg portion of the cavity. Both the button and the end of the rod are free to rotate within the cavity, but the button is captured within the cavity. Accordingly, when the rod is rotated the guide blocks 232 and 236 are caused to move toward or away from one another, thereby changing the angle "C" between the first and second guide members.

In FIG. 7 there is depicted a further embodiment of a tool in accordance with the present invention. In this depicted embodiment, there are provided three guide members, as opposed to two guide members as described hereinabove. In the embodiment depicted in FIG. 7, there is provided a first guide member 260 which is substantially identical to the second guide member 84 depicted in FIG. 4, a second guide member 262 which is also substantially identical to the second guide member 84 depicted in FIG. 4, and a third guide member 264. This third guide member 264 comprises an intermediate guide member between the inboard ends 268 and 270 (typical) of the first and second guide members 260 and 262 and functions to hingedly connect the inboard ends of the first and second guide members 260 and 262 together. To this end, the opposite ends 272 and 274 of the second guide member 264 are fitted with clevis-type connectors 276 and 278 that receive therein the ends 268 and 270 of the first and second guide members 260 and 262. In this embodiment of the tool, the angle "A" between the second and third guide members, as well as the angle "B" between the third and first guide members are selectable thereby adding additional adjustability to the tool.

Figures 11, 12, 13:
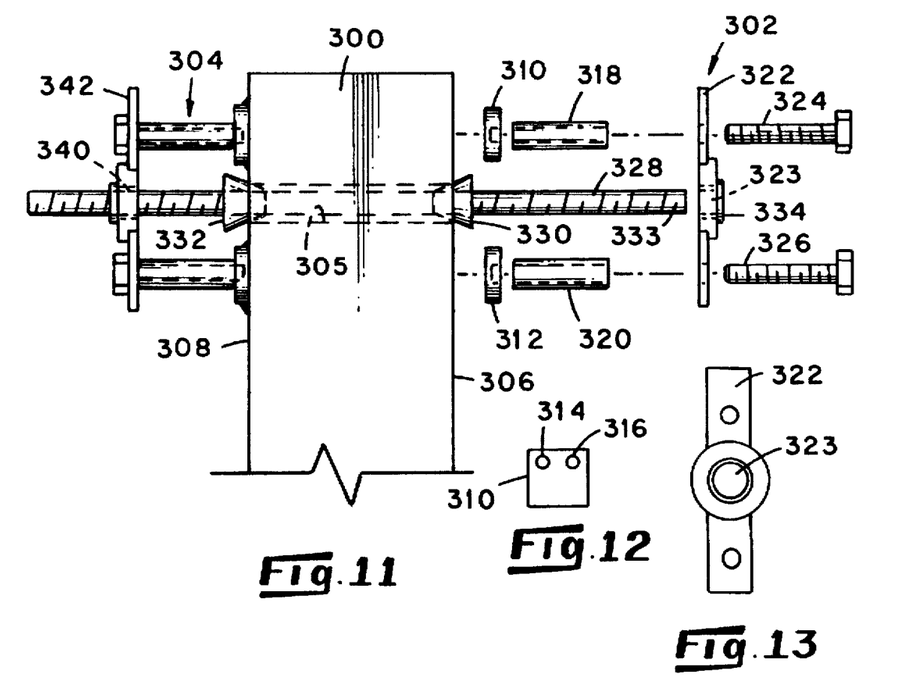
FIG. 11 is a representation, partly exploded, of a portion of an equipment component to be rebored employing the alignment tool of the present invention and depicting the mounting thereto of mounting brackets.
FIG. 12 is a plan view of one embodiment of a mounting plate employed in the mounting bracket depicted in FIG. 11.
FIG. 13 is plan view of one embodiment of a bearing plate employed in the mounting bracket depicted in FIG. 11.

Referring specifically to FIGS. 11–13, in preparation for the mounting of the present tool onto an equipment component 300 which is to be rebored, there is initially secured to the equipment component mounting brackets 302 and 304 on opposite sides 306 and 308 of the equipment component and adjacent to a bore 305 through the thickness of the equipment component. Each of these mounting brackets, in the depicted embodiment, comprises first and second mounting plates 310 and 312, each of which is adapted to be welded directly to the equipment component and includes one or more internally threaded bores 314, 316 therein, tubular spacers 318 and 320, a centrally bored 323 bearing plate 322 and one or more bolts 324, 326 which are suitable for threading through openings through the thickness of the mounting plate, thence through the spacers and be received in the internally threaded bores 314,316 in the mounting plates. As noted, one such mounting bracket is intended for each of the opposite sides of the equipment component.

As depicted in FIGS. 11–13, mounting of the brackets 302 and 304 to the equipment component to be rebored includes placement of an elongated bar 328 through a bore 305 through the thickness of the equipment component, followed by fitting onto the opposite ends of the bar first and second cones 330 and 332. These cones are slid along the length of the bar and their tapered ends are caused to enter the opposite ends of the bore to thereby center the longitudinal axis of the bar with respect to the longitudinal axis of the bore. Thereupon, the bearing plate 322, and the spacers 318 and 320 are mounted to the mounting plates 310 and 312, employing the bolts 324 and 326. The bearing plate 322 of this assembled bracket 302 is slid onto the end 333 of the bar 328, the bar passing through the central bore 323 through the bearing plate. In a preferred embodiment, the central bore 323 through the bearing plate is fitted with a universal bearing 334 to accommodate slight axial misalignments. This action urges the mounting plates 310 and 312 into contact with the side 306 of the equipment component, whereupon these plates are tack welded to the equipment component to secure the mounting bracket 302 to the side 306 of the equipment component and in a position in which the central bore of the mounting plate is aligned with the longitudinal axis of the bore 305. The mounting bracket 304 is positioned and mounted to the opposite side 308 of the equipment component in like manner as the mounting of the mounting bracket 302, with the central bore 340 of the bearing plate 342 of the mounting bracket 304 aligned with the longitudinal axis of the bore 305. Thereupon, the bar 328 and the cones 330 and 332 are removed.

In accordance with one aspect of the present invention, the length of the several cross members 90, 92, 152, and 154 that interconnect the side members of each guide member is chosen to provide a spacing of the side members sufficiently apart as will permit the receipt therebetween of an equipment component which is to be rebored. Because equipment components vary greatly in size, especially thickness, the length of the cross members of the present tool are chosen to provide a maximum anticipated required clearance between the side members of a guide member. Employing spacers 318, 320 of appropriate length, this maximum size tool can be used in reboring operations for any thickness of an equipment component which is less than the designed maximum thickness. It is to be recognized, however, that the present tool may be sized to provide for its fit to a given equipment component such that the brackets 302,304 and their accompanying spacers may not be required or employed in a given reboring operation.

Figure 14:
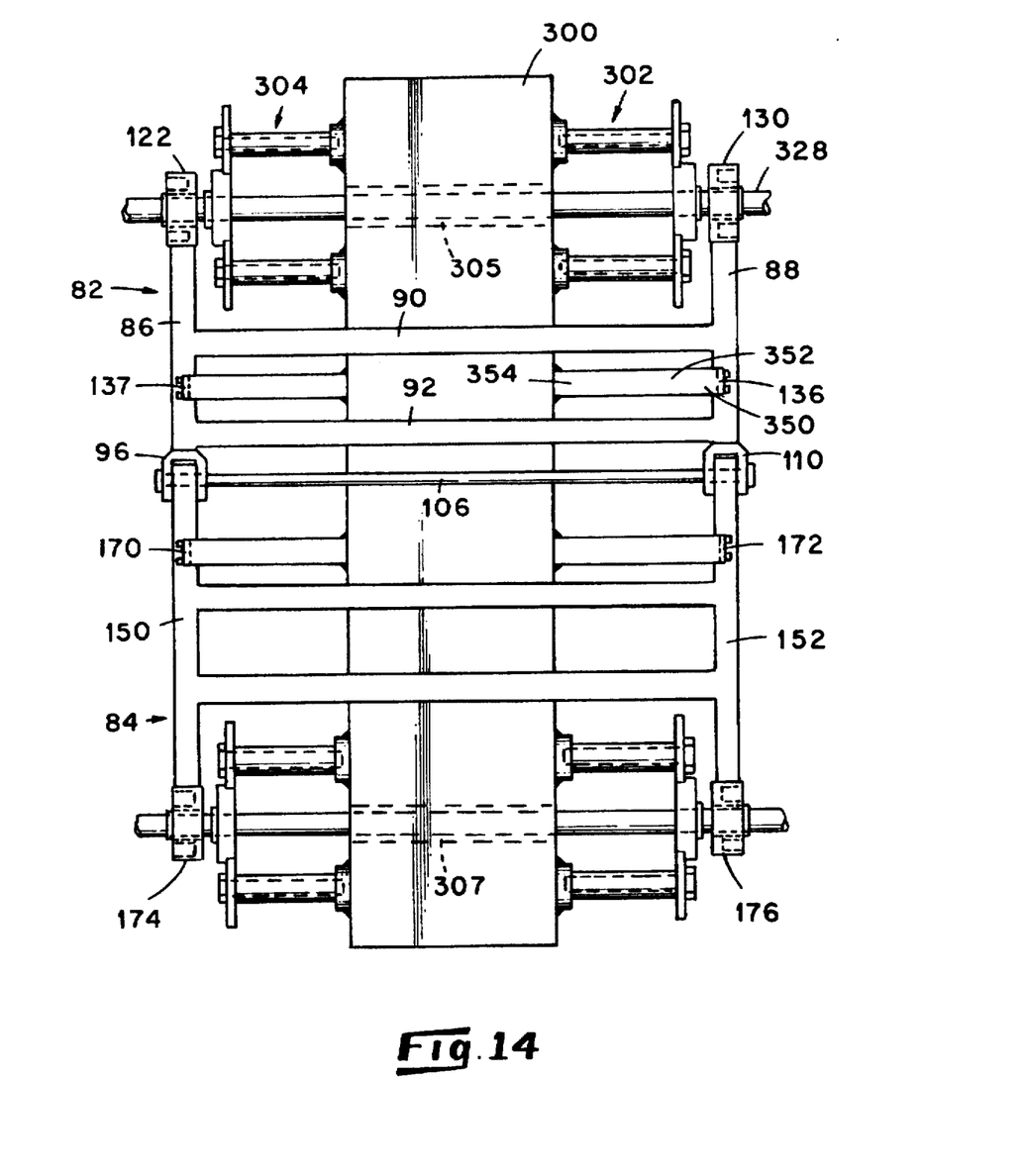
FIG. 14 is a representation of a portion of an equipment component having an alignment tool of the present invention mounted thereon.
Figure 15:
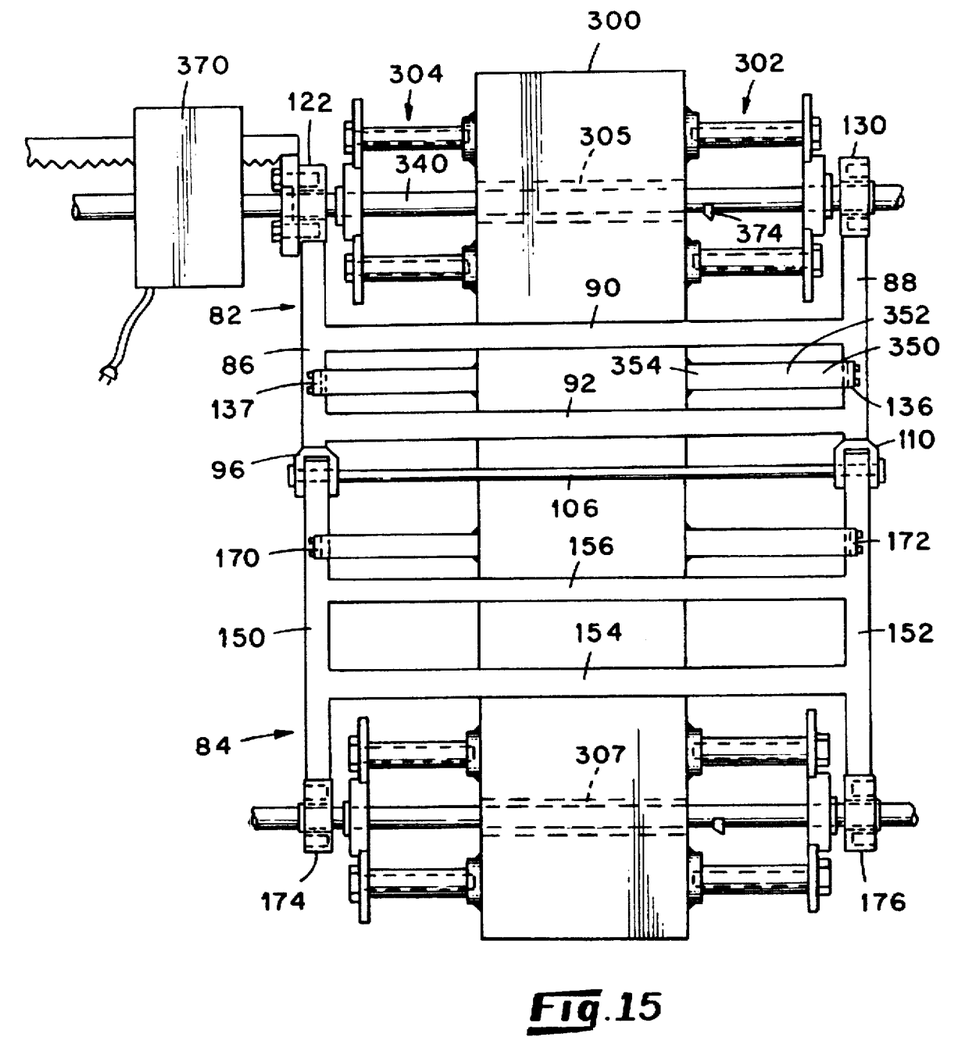
FIG. 15 is a representation of a portion of an equipment component as depicted in FIG. 14 and including a portable boring bar drive unit mounted thereon.

With specific reference to FIGS. 14 and 15, in preparation for a reboring operation, at least the opposite ends of the bore 305 through the thickness of the equipment component are built up as by weld metal. The tool of the present invention is positioned with the mounting hubs 122 and 130 thereof on opposite sides of the equipment component and in general axial alignment with the bore 305 through the equipment component. Thereupon a boring bar 340 is fed through the bore 124, thence through the bore 323 of the mounting plate 322, thence through the bore 305 through the thickness of the equipment component, thence through the central bore 340 of the mounting plate 342, and finally through the aligned bore 132 of the mounting hub 130. This action positions the boring bar centrally of the bore 305. Notably, at this stage of the operation, the operator is only required to work with the present tool. Further, at this stage of the operation, the first guide member is rotatable with respect to the bore 305 and the second guide member 84 is free to articulate about the axis of its joinder with the first guide member 82, i.e. about the longitudinal axis of the clevis pin 116.

Thereupon, the first and second guide members 82 and 84 are rotated about the axis of their joinder to select a linear distance between the bores 124 and 132 in their respective outboard ends. This linear distance equates to the desired linear distance between the first bore 305 with which the bore 124 is aligned and a second desired bore 307 through the equipment component so that the selected angular relationship between the first and second guide members positions the bores 180 and 182 of the outboard ends of the second guide member 84 in alignment with the desired location of this desired second bore 307 through the thickness of the equipment component.

When the bores 180 and 182 of the second guide member are aligned with the desired location of the second bore 307 through the thickness of the equipment component, the second guide member is anchored to the component as by bolting a metal strip to one or more of the anchor lugs 200,202 (typical, see FIG. 8) on one or both of the mounting hubs 174 and 176 and then spot welding the outboard end of the strip directly to the equipment component. Attaching the metal strip to the anchor lug by bolts prevents one having to weld directly to the anchor lug itself, thereby effectively extending the useful life of the tool of the present invention since such welding directly to the anchor lug can contribute to destruction of the mounting hub and/or deleterious misalignment of the components of the tool, such as warping of a guide member out of its plane. Thus, rather than actually spot welding the guide member itself to the component, the present invention preferably provides for the use of a disposable metal strip between the anchor lug and the equipment component. Alternatively, each of the first and second guide members may be anchored to the equipment component as by means of the anchor lugs 136, 137, and/or 170,172 that are provided on the side members 86, 88, 150 and 152. Again, the anchor lug preferably has releasably attached thereto one end 350 of a metal strip 352 (see FIG. 15) whose opposite end 354 is spot welded to the equipment component in a typical anchor location.

With the present alignment tool thus attached to the component being worked upon, referring to FIG. 15, a conventional portable boring bar drive unit 370 may be attached to the alignment tool at either of the mounting hubs, hub 122 for example, for carrying out the reboring of either bore. In accordance with one aspect of the present invention, the mounting hubs provided on each of the outboard ends of each of the side members of each of the first and second guide members are designed to receive a portable boring bar drive unit. The mount preferably is made universal in nature as to receive any of several commercially available portable boring bars drive units. In a preferred embodiment, this mount includes the plurality of internally threaded bores 204 (typical) spaced over its surface area which are adapted to receive therein bolts 372 (typical) which anchor the boring bar drive unit to the hub. As noted hereinabove each mounting hub includes a central spherical bearing through which the boring bar 340 with its cutting tool 374 may be inserted and supported for rotation of the boring bar during a reboring operation. It is noted that the mounting of the portable boring bar drive unit is made relatively safe and efficient by reason of the rigid anchoring of the present alignment tool to the component prior to the mounting of the boring bar drive unit itself to the alignment tool.

Whereas the present tool has been described in connection with a portable boring bar, it is to be recognized that the tool is suitable for use as an alignment tool for aligning the relative locations of two spaced apart bores in an equipment component, whether or not reboring is performed. Further, one skilled in the art will recognize equivalents for various of the components of the present tool as described herein and it is intended that the invention be limited only as set forth in the claims attached hereto.

What is claimed:

1. An alignment tool for aligning a portable boring bar for reboring of a first bore at a location relative to a further bore in an equipment component comprising a first guide member of generally "H"-shape including first and second preferably rigid elongated side members, each of said side members including an inboard end and an outboard end, each of said outboard ends of said first and second side members defining a mounting hub having a through bore defined therein, said bore including a longitudinal axis which is aligned substantially perpendicular to the length dimension of its respective side member, each of said inboard ends of said first and second side members defining a first portion of a hinged connection between said first and second side members, a second guide member of generally "H"-shape including first and second preferably rigid elongated side members, each of said side members including an inboard end and an outboard end,     each of said outboard ends of said first and second side members defining a mounting hub having a through bore defined therein, said bore including a longitudinal axis which is aligned substantially perpendicular to the length dimension of its respective side member,     each of said inboard ends of said first and second side members defining a further portion of a hinged connection between said first and second side members, a rigid cross member extending between said side members of said first guide means and maintaining said side members of said first guide means in a spaced apart and parallel relationship such that said side members and said cross member associated therewith lie in a substantially common plane, a further rigid cross member extending between said side members of said second guide means and maintaining said side members of said second guide means in a spaced apart and parallel relationship such that said side members and said cross member associated therewith lie in a substantially common plane, means for hingedly connecting said first and second guide members at their inboard ends along an axis of rotation which is substantially parallel to an intersection of said planes of said first and second guide members such that through selection of the angular relationship of the planes of said first and second guide members, said outboard ends of said first guide member may be spaced apart from said outboard ends of said second guide member by a distance which is representative of the desired lineal distance between the first bore and the further bore.

2. The alignment tool of claim 1 and including means for mechanically selecting the angular relationship between the planes of said first and second guide means.

3. The alignment tool of claim 1 and including a third guide member interposed between the inboard ends of said first and second guide members, said third guide member including opposite ends thereof which are hingedly connected to the inboard ends of said first and second guide members.

4. The alignment tool of claim 1 wherein said side members of said first guide member and said side members of said second guide member, respectively, are spaced apart by a distance greater than the length of a bore through the equipment component which is to be rebored.

5. The alignment tool of claim 1 and including mounting brackets attached to opposite sides of the equipment component to be rebored and adjacent to opposite ends of the bore through the equipment component.

6. The alignment tool of claim 1 wherein said bore through each of said mounting hubs is of a size suitable to receive therethrough a boring bar of a portable boring bar device.

7. The alignment tool of claim 1 and including a mounting plate releasably secured to one or more of said mounting hubs, said mounting plate including one or more anchor tabs secured thereon.

\* \* \* \* \*